No. 672,882. Patented Apr. 30, 1901.
C. M. AUKERMAN.
PURIFYING SYSTEM FOR CRUDE PETROLEUM.
(Application filed Oct. 25, 1900.)
(No Model.)
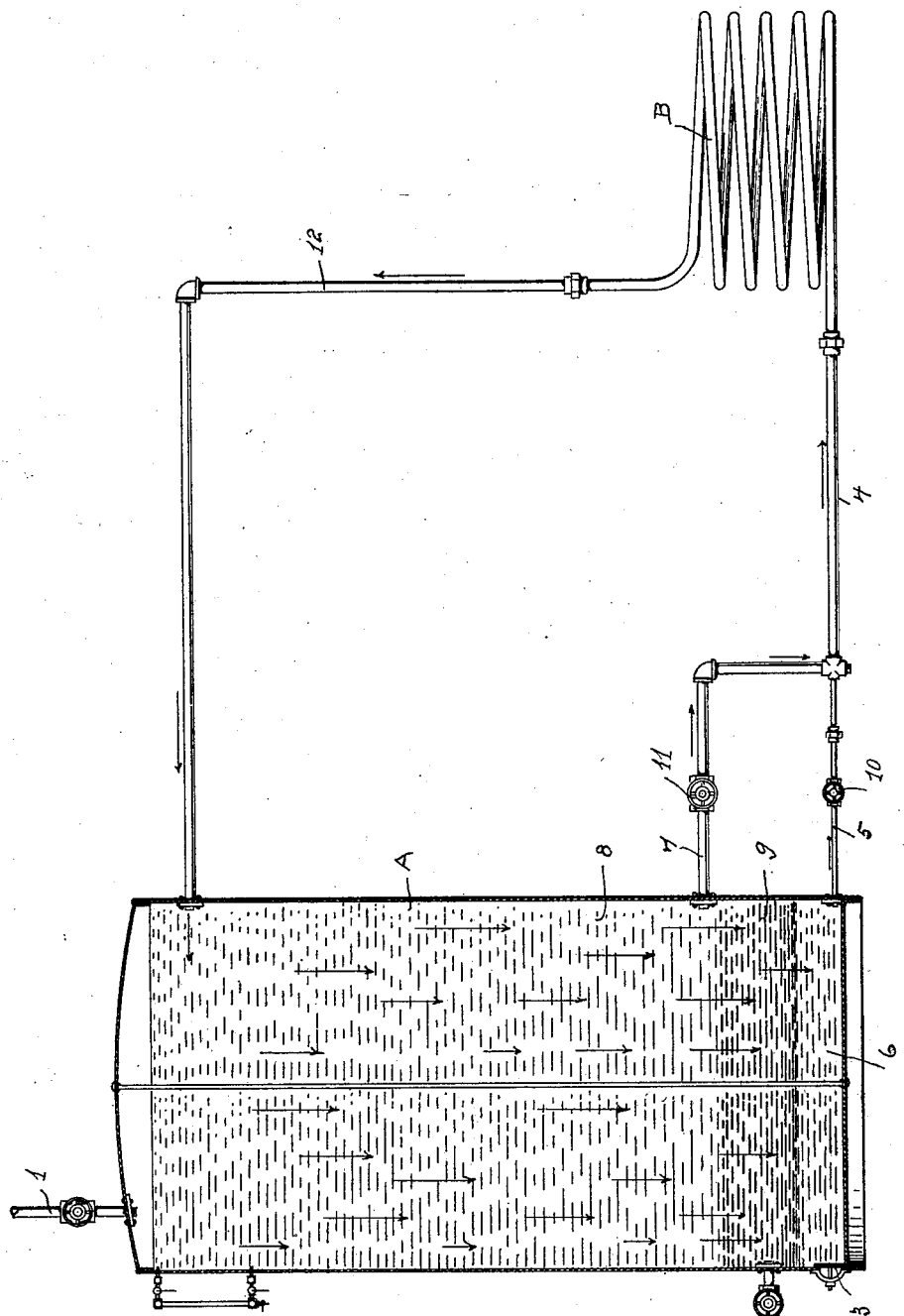
Witnesses—
Herman H. Martin
Chas. A. Boake
Inventor—
Cal M. Aukerman
By Robt. B. Wilson
his Attorney
THE NORRIS PETERS CO., PHOTO-LITHO., WASHINGTON, D. C.

UNITED STATES PATENT OFFICE.

CAL M. AUKERMAN, OF RISINGSUN, OHIO.

PURIFYING SYSTEM FOR CRUDE PETROLEUM.

SPECIFICATION forming part of Letters Patent No. 672,882, dated April 30, 1901.

Application filed October 25, 1900. Serial No. 34,263. (No model.)

*To all whom it may concern:*

Be it known that I, CAL M. AUKERMAN, a citizen of the United States, residing at Risingsun, in the county of Wood and State of Ohio, have invented a new and useful Improvement in Purifying Systems for Crude Petroleum, of which the following is a specification.

My invention relates to purifying systems for crude petroleum.

More or less water and impure and deleterious matter are mixed with petroleum as it is pumped from wells. The water being the heaviest settles to the bottom of the receiving-tank, and the impurities being heavier than the oil and lighter than the water partially separate from the oil and settle by gravity, forming a sedimentary stratum between the water at the bottom and the body of the oil above. There remains, however, more or less of this impure matter in suspension in the body of the oil that will not settle out of it by gravity alone, and more or less oil is carried down with the sediment and is retained therein. Unless separated from the oil the impure matter in suspension lowers the quality of it, and the oil mixed with the sediment unless released is lost.

The object of my invention is to provide simple, ready, and economical means of attaining a more complete precipitation and separation of the deleterious matter from the oil, and thereby improve the quality and diminish the loss of oil. I attain this object in the manner and by the means hereinafter described, and illustrated in the drawing.

The drawing is a diagrammatic illustration of my system, wherein—

A is a receiving-tank having an inlet-pipe 1, connected to the well-pump, an outlet-pipe 2 to the storage-tank, and an orifice at the bottom for discharging the water and sediment, provided with a closure 3.

B is a heating-coil which is provided with any suitable means for heating. (Not shown.)

4 is a pipe connected to the lower end of coil B, having a branch 5 extending to and into the water stratum 6 in the bottom of the tank, and another branch 7 extending into the body of the oil 8 just above the stratum of sediment 9.

10 and 11 are valves in the branch pipes 5 and 7 for controlling the inlet of water and oil to the coil B.

12 is a pipe connected to the top end of the coil B and connecting it with the body of the oil at the top of the tank A. Thus constructed and connected by opening the valves 10 and 11 both oil and water will flow through pipe 4 until the coil B and its connecting pipes are filled, whereupon by heating coil B the heated oil and water will flow upward through pipe 12, thereby establishing a circulation of heated oil and water from the top of the tank to the bottom. The heated water, by reason of its greater specific gravity, will settle through the body of the oil and the stratum of sediment to the bottom. By this circulation of heated oil and water the temperature of the contents of the tank may be increased to any desired degree below vaporization of the more volatile portions of the oil. This increase of temperature facilitates the separation of the oil from the refuse held in suspension, while the downward flow of oil and water precipitates the refuse to the bottom, and the percolation of the heated water through the stratum of sediment heats and disintegrates it, so as to release and separate from it the oil mixed with it and cause a more accurate definition between the body of the oil and the refuse sediment, which latter as the operation continues becomes more compact and the stratum reduced in thickness. In the drawing the stratum of sediment is shown as it appears at the beginning of the settling operation. When it is completed, the top of the stratum of sediment is below the opening of the outlet oil-pipe to the storage-tank, so that the oil may be drawn off without disturbing the sediment.

I am aware that a heating-coil having oil-pipe connections with the oil-body has been used to establish a circulation of the oil for a similar purpose; but I am not aware of any similar use being made of the water in the tank for such purpose. By the circulation of the oil alone the stratum of sediment is not heated and disintegrated, and the oil mixed with it is not released and separated from it and necessarily results in its loss.

While by my improved system a circulation of the water alone may be used, it is found in practice that it requires more heat to maintain an active circulation with salt water alone and that more or less oil introduced therewith produces a much more rapid circulation, and better results are obtained. The proportions of each are readily regulated and controlled by the valves 10 and 11. Water may be added to or drawn from the tank, as required, to bring the top of the stratum of sediment just below the opening of the oil-discharge pipe 2.

Having thus fully described the construction and operation of my improved system, what I claim to be new, and desire to secure by Letters Patent, is—

1. In an oil-purifying system, the combination with a receiving-tank of a heating-coil connected at one end to the lower portion of the tank by branch pipes, one branch tapping the tank below the normal water-level, and another branch above the normal sediment-level, the opposite end of the coil being connected with the top portion of the tank by a pipe having its opening within the tank below the normal oil-level, substantially as shown and described and for the purpose specified.

2. In an oil-purifying system, the combination with a receiving-tank of a heating-coil connected at one end to the lower portion of the tank by branch pipes, each having a controlling-valve, one branch tapping the tank below the normal water-level, and another branch above the normal sediment-level, the opposite end of the coil being connected with the top portion of the tank by a pipe having its opening within the tank below the normal oil-level, substantially as shown and described and for the purpose specified.

In witness whereof I have hereunto set my hand this 20th day of October, A. D. 1900.

CAL M. AUKERMAN.

Witnesses:
F. K. HOGUE,
R. L. HUMMEL.